(12) United States Patent
Morgan

(10) Patent No.: US 11,545,043 B1
(45) Date of Patent: Jan. 3, 2023

(54) INTERFACE FOR EDUCATIONAL TOOL

(71) Applicant: Marlyn Andrew Morgan, Conroe, TX (US)

(72) Inventor: Marlyn Andrew Morgan, Conroe, TX (US)

( * ) Notice: Subject to any disclaimer, the term of this patent is extended or adjusted under 35 U.S.C. 154(b) by 0 days.

(21) Appl. No.: 17/897,357

(22) Filed: Aug. 29, 2022

Related U.S. Application Data

(63) Continuation-in-part of application No. 17/675,069, filed on Feb. 18, 2022.

(51) Int. Cl.
*G09B 7/06* (2006.01)
*G06F 3/0482* (2013.01)

(52) U.S. Cl.
CPC ............. *G09B 7/06* (2013.01); *G06F 3/0482* (2013.01)

(58) Field of Classification Search
None
See application file for complete search history.

(56) References Cited

U.S. PATENT DOCUMENTS

| | | | |
|---|---|---|---|
| 5,122,952 A | 6/1992 | Minkus | |
| 5,153,830 A | 10/1992 | Fisher | |
| 6,299,452 B1 | 10/2001 | Wasowicz | |
| 6,719,290 B1 | 4/2004 | Kershner | |
| 6,729,882 B2 | 5/2004 | Noble | |
| 7,402,042 B2 | 7/2008 | Kelley | |
| 8,434,020 B2 | 4/2013 | Martyn | |
| 8,713,476 B2 | 4/2014 | Martyn | |
| 8,825,492 B1 | 9/2014 | Buhadi | |
| 2004/0009462 A1 | 1/2004 | McElwrath | |
| 2013/0260346 A1 | 10/2013 | Wood | |
| 2014/0081636 A1* | 3/2014 | Erhart | G10L 15/065 704/236 |
| 2014/0278344 A1 | 9/2014 | Xiao | |
| 2019/0329125 A1 | 10/2019 | Peretz | |
| 2020/0135181 A1 | 4/2020 | Anders | |

OTHER PUBLICATIONS

The Effect of Gamification on Elementary Students' Spanish Language Achievement and Academic Self-Efficacy. [online]. Rachels, Apr. 2016 [retrieved on Jan. 13, 2022]. Retrieved from the Internet: <URL: https://digitalcommons.liberty.edu/cgi/viewcontent.cgi?article=2296&context=doctoral>. Relevant Passages: p. 26, "Summary," Paragraph 1; p. 26, "Problem Statement," Paragraph 1.
Rhyming Activities for Early Readers. [online]. Brauner, Jan. 16, 2019 [retrieved on Jan. 14, 2022]. Retrieved from the Internet: <URL: https://www.perkinselearning.org/technology/blog/rhyming-activities-early-readers>. Relevant Passage: p. 3, Paragraphs 1 and 2.

* cited by examiner

*Primary Examiner* — James B Hull
(74) *Attorney, Agent, or Firm* — Laurie A. Schlichter, PLLC

(57) ABSTRACT

An interface for an educational tool on an electronic device is described. The interface comprises a main menu to display at least an icon for the educational tool. The main menu appears on a display screen of the electronic device. The interface also comprises a summary menu to list a subset of at least one function of the educational tool. The summary menu is accessed directly from the main menu when a user selects the icon for the educational tool. The interface further comprises an exhibitory window to display a rhyming riddle function of the educational tool selected by the user from the subset listed on the summary menu. The rhyming riddle function presents the user with a rhyming riddle to be solved.

9 Claims, 5 Drawing Sheets

INTERFACE FOR EDUCATIONAL TOOL

TECHNICAL FIELD

The present disclosure relates generally to techniques for implementing an interface on an electronic device. More specifically, the present techniques relate to implementing an interface for an educational tool application.

BACKGROUND ART

An interface on an electronic device allows a user to navigate to a function of interest and initiate it. The user has to navigate to the appropriate application, open it, and then navigate within that application to locate the desired function. It may be necessary for the user to scroll and switch views many times to locate the function of interest. The result is a slow and inefficient navigation process.

BRIEF DESCRIPTION OF THE DRAWINGS

The same numbers are used throughout the disclosure and the figures to reference like features. Numbers in the 100 series refer to features originally found in FIG. 1; numbers in the 200 series refer to features originally found in FIG. 2; and so on.

DESCRIPTION OF THE EMBODIMENTS

The interface disclosed herein is an improvement over conventional interfaces described above. The present interface utilizes a summary menu that contains a limited list of functions commonly selected by a user. The summary menu is accessed directly from a main menu that lists a user's applications. As a result, speed of navigation and ease of use are improved, especially on electronic devices having small screens. For example, only three steps are required to reach a window that allows the user to interact with the function of interest. First, the main menu is launched. Second, the summary menu is launched when the appropriate application is selected from the main menu. Third, the aforementioned window is launched when the desired function is selected from the summary window. The user no longer has to page through a multiplicity of screens to reach the function of interest.

The present interface can be utilized with an educational tool. This tool presents factual information in a rhyming riddle format that promotes the acquisition and retention of the factual information. A user is more apt to remember the information presented in a riddle because the rhyming format makes the facts more memorable and the learning process more enjoyable. Furthermore, a user is more likely to use the educational tool and acquire more knowledge if the interface for the tool is simple and quick.

The subject matter disclosed herein relates to techniques for improving the performance of an interface on an electronic device. For example, a main menu may display at least an icon for an educational tool application. The main menu may appear on a display screen of the electronic device. A summary menu may list a subset of at least one function of the educational tool application. The summary menu may be accessed directly from the main menu when a user selects the icon for the educational tool. An exhibitory window may display a rhyming riddle function of the educational tool selected by the user from the subset listed on the summary menu. The rhyming riddle function may present the user with a rhyming riddle to be solved. Various examples of the present techniques are described below with reference to the figures.

Figure 1:
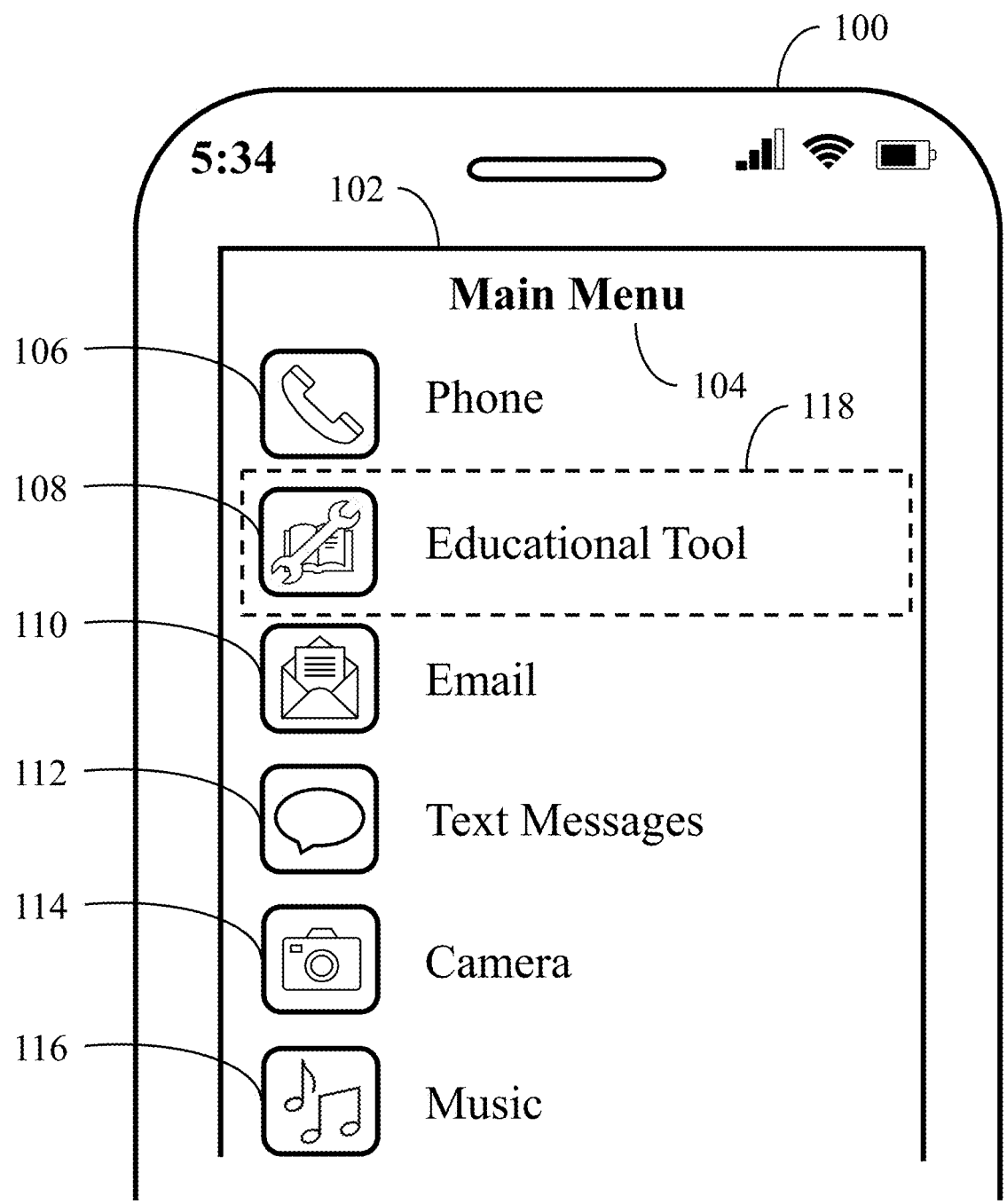
FIG. 1 is an enlarged screenshot of a mobile phone's main menu.

FIG. 1 is an enlarged screenshot of a mobile phone's main menu. The mobile phone 100 may have a display screen 102 that shows its main menu 104. The menu may display applications such as "Phone" 106, "Educational Tool" 108, "Email" 110, "Text Messages" 112, "Camera" 114, "Music" 116, or the like. The name of the application may appear next to the icon for the application. The icons may be aligned vertically with one icon and its name to a line.

The user may arrange the icons so that the icons for his or her favored applications are placed at the top of the vertical column of icons and appear on the display screen 102. This may become the default arrangement for the main menu 104. For example, the main menu 104 may appear as shown in FIG. 1 when the mobile phone 100 starts up or when the user returns to the menu after navigating to another screen. The icons for the remaining applications may be placed below the music application 116 and are accessed using conventional navigation methods, such as scrolling.

The display screen 102 may have a highlight function used to select an application. The highlight function may be scrolled until the application of interest is highlighted. The user may tap the highlighted application to access a summary menu. This menu may allow the user to select the function of the application he or she intends to use. For example, in FIG. 1, the educational tool 108 has been highlighted as indicated by the dashed box 118. When the user taps this highlighted application, a large portion of the main menu 104 may be obscured by the summary menu 200 for the educational tool 108. The user may select the function of the application that he or she uses to answer questions that promote the acquisition and retention of factual information.

Figure 2:
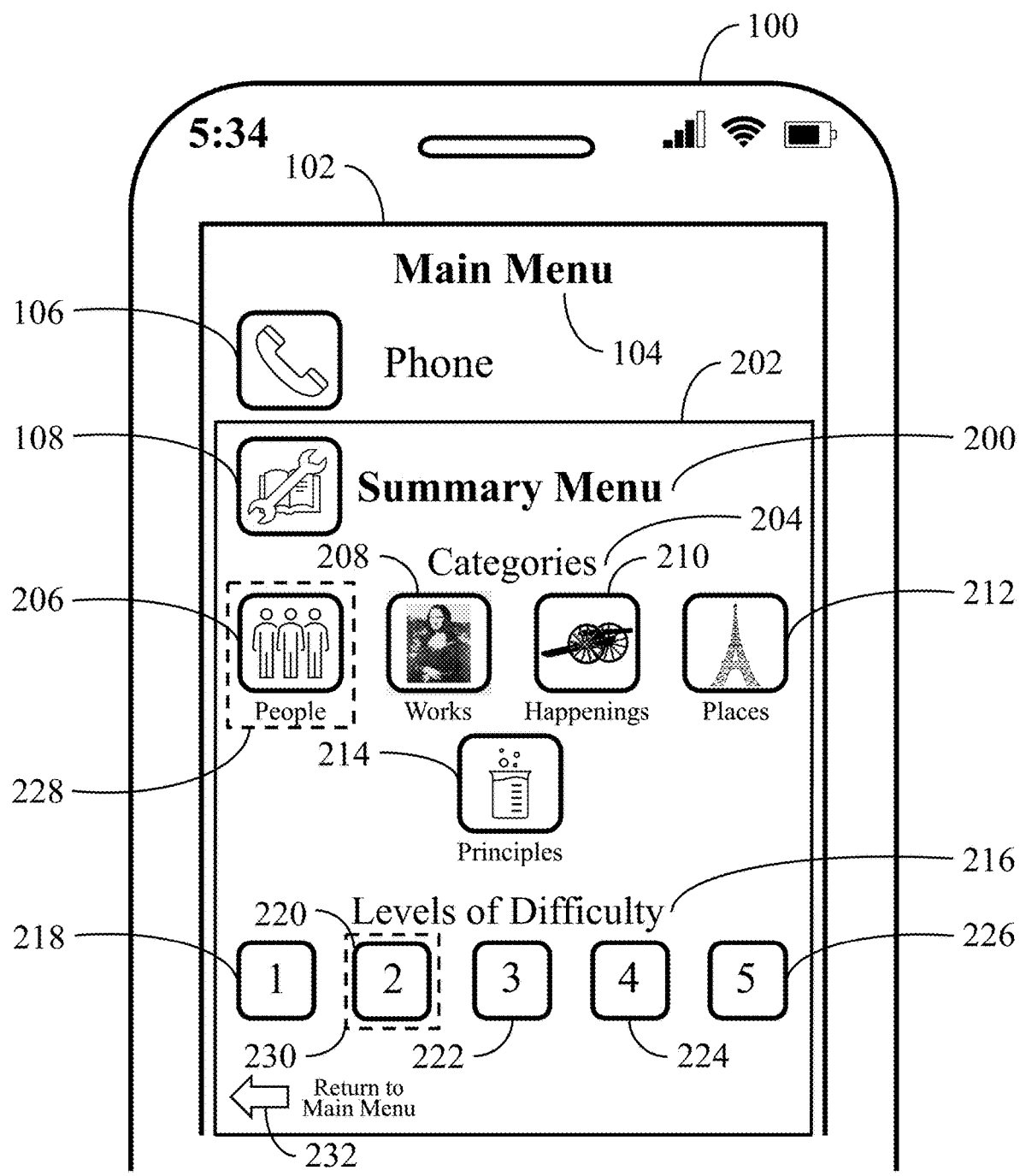
FIG. 2 is an enlarged screenshot of a summary menu for an educational tool application.

FIG. 2 is an enlarged screenshot of a summary menu for an educational tool application. The summary menu 200 may be accessed directly from the main menu 104. When the user selects the educational tool 108, the summary menu 200 may be opened without launching the educational tool application. The summary menu 200 may drop down from the highlighted application. In FIG. 2, the summary menu 200 replaces the main menu 104 from the highlighted educational tool application down to the bottom of the display screen 102. Accordingly, the phone application is all of the main menu 104 that remains visible.

The summary menu 200 may display a subset of the functions of the educational tool 108. The mobile phone 100 may identify the functions that are most often selected by the user. The subset may be formed from the identified functions. Alternatively, the user may choose the functions included in the subset. In FIG. 2, the subset contains a single function. The function is the rhyming riddle function of the educational tool application. The rhyming riddle function may display rhyming riddles that the user attempts to solve. As explained below, the rhyming riddle function is just one of the many functions of the educational tool 108. A border 202 may surround the summary menu 200 to prevent the user from selecting functions that are not included in the sub set.

The summary menu 200 may display two series of icons. An icon may be selected from each series to launch the educational tool and initiate the rhyming riddle function. The first series may contain icons that represent the categories 204 that are the subjects of the rhyming riddles. The categories 204 may include people 206, works 208, happenings 210, places 212, and principles 214.

The user may select the icon representing people 206 when he or she wants to solve rhyming riddles that concern famous people, living or deceased, who are renowned for their impact on civilization and the course of world history. The icon corresponding to works 208 may be selected when the user opts to solve rhyming riddles that relate to creations, contributions, and discoveries in the fields of architecture, art, film, literature, music, economics, government, law, medicine, science, or the like. The icon associated with happenings 210 may be chosen when the user decides to solve rhyming riddles that pertain to eras, movements, wars, famines, periods of prosperity, depressions, revolutions, causes, campaigns, or the like. The icon relating to places 212 may be the icon of choice when the user intends to solve rhyming riddles about continents, regions, countries, states, cities, well-known locales, notable edifices, the sites of historical events, or the like. When chosen, the icon concerning principles 214 may allow the user to solve rhyming riddles that relate to concepts a student has to master in subjects such as mathematics, biology, chemistry, physics, economics, government, art, music, or the like.

The second series of icons on the summary menu 200 may correspond to the levels of difficulty 216 for the rhyming riddles presented to the user. The levels of difficulty 216 may be integers that range from a minimum value for rhyming riddles that are easiest to solve to a maximum value for rhyming riddles that are hardest to solve. For example, as shown in FIG. 2, the minimum value may be equal to one and the maximum value may be equal to five. Accordingly, there are five icons for level of difficulty displayed on the summary menu 200.

Each icon may have an integer in it. When one of these icons is selected, the user will be presented with rhyming riddles that have the level of difficulty that corresponds to the integer in the icon. For example, rhyming riddles that are easiest to solve may have a level of difficulty of "1," the integer contained in icon 218. The user may select icon 220, which has the integer "2" in it, when he or she intends to solve easy rhyming riddles. Icon 222 contains the integer "3" and may be chosen when the user seeks to answer rhyming riddles of intermediate difficulty. Rhyming riddles that are hard to solve may have a level of difficulty of "4," the integer shown in icon 224. The user may select icon 226, which contains the integer "5," when he or she wants to attempt to answer the hardest-to-solve rhyming riddles. Each of icons 218-226 may be selected by tapping it.

The educational tool application may be launched and the rhyming riddle function may be initiated when the user selects an icon for the category of the rhyming riddles and an icon for the level of difficulty of the rhyming riddles. Both an icon for category and an icon for level of difficulty have to be selected if the educational tool application is to launch and the rhyming riddle function is to initiate. In FIG. 2, there are two dashed boxes that indicate which icons the user has chosen. The dashed box 228 indicates that the user has selected people 206 for the category and the dashed box 230 indicates that the user has selected "2" for the level of difficulty. Because an icon has been selected from both series of icons, the educational tool application launches and the rhyming riddle function initiates. Hence, the summary menu 200 is replaced by the exhibitory window.

Figure 3:
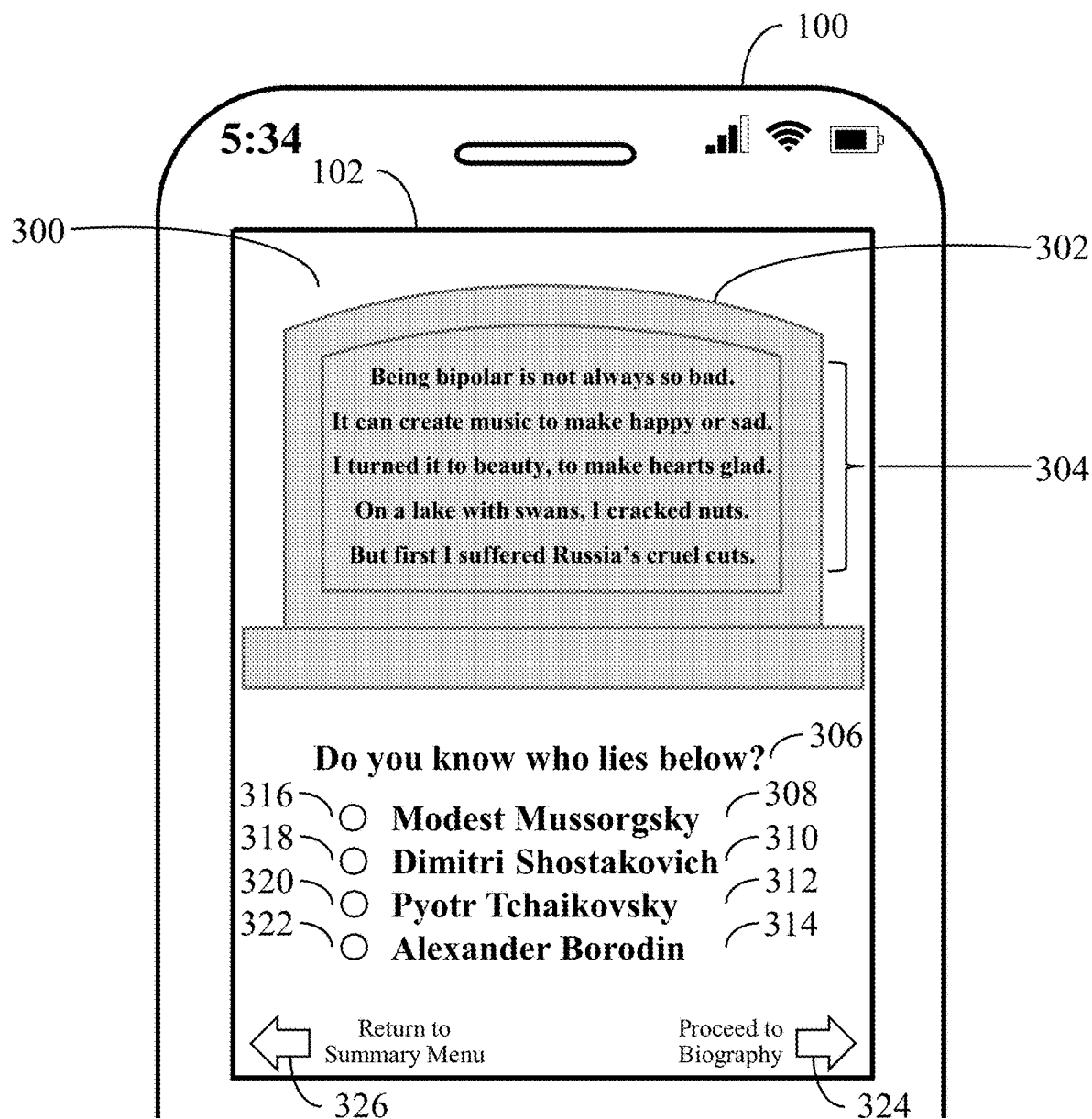
FIG. 3 is an enlarged screenshot of an exhibitory window for a rhyming riddle function.

FIG. 3 is an enlarged screenshot of an exhibitory window for a rhyming riddle function. Only three steps may be required to reach the exhibitory window 300 using the interface for the educational tool. First, the main menu 104 may be launched. Second, the summary window 200 may be launched when the educational tool application is selected from the main menu 104. Third, the exhibitory window 300 may be launched when the rhyming riddle function is selected from the summary window 200. Accordingly, the interface for the educational tool is faster than conventional navigation approaches. Furthermore, the transition between steps is clear and straightforward. As a result, users will find the interface preferable to more complex navigation techniques.

The exhibitory window 300 may occupy most of the display screen 102 of the mobile phone 100. In FIG. 3, the exhibitory window 300 displays a headstone 302, but the epitaph has been replaced by a rhyming riddle 304 obtained from a database that stores rhyming riddles created by a plurality of users. The database was instructed to choose a rhyming riddle that concerns the category represented by the icon selected from the first series of icons and has the level of difficulty corresponding to the icon selected from the second series of icons displayed on the summary menu 200. Consequently, the rhyming riddle 304 concerns a famous person and has a level of difficulty of "2." In the embodiment shown in FIG. 3, the rhyming riddle is about a famous deceased person. The category for people 206 may include rhyming riddles that relate to famous people, living or deceased. In the present embodiment, the database randomly selected a rhyming riddle about a famous deceased person.

A question 306 "Do you know who lies below?" and a set of answer choices 308-314 may appear below the headstone 302 in the exhibitory window 300. The set of answer choices 308-314 may be preceded by radio buttons 316-322. Selecting a radio button selects the corresponding answer choice. The set of answer choices 308-314 may contain the correct answer to the rhyming riddle 304. The three incorrect answer choices may be randomly selected from a group of answer choices that have similar characteristics to the correct answer. In the present embodiment, all four answer choices 308-314 are famous Russian composers who lived during the 19th and 20th centuries.

The user may select answer choices until he or she selects the correct answer or has selected all of the incorrect answer choices and only the correct answer remains. If the user chooses the correct answer 312 "Pyotr Tchaikovsky," he or she may select arrow 324 and a biography of Tchaikovsky will appear in the exhibitory window 300. Similarly, the user may select arrow 324 if he or she has chosen all three incorrect answer choices and the correct answer is evident.

The user may continue to solve rhyming riddles that are about people 206 and have a level of difficulty of "2." However, the user may decide that he or she wants to solve rhyming riddles from a different category or that have a different level of difficulty. The user may choose arrow 326 and return to the summary menu 200. From there, the user may select a different icon from the first series or the second series of icons. Alternatively, the subset of preferred functions may contain more than one function. When this occurs, the user may choose a different function of the selected application. Furthermore, if the user decides to change applications, he or she may select arrow 232 at the bottom of the summary menu 200 and return to the main menu 104. The user may choose an icon for one of his or her preferred applications that are placed at the top of the vertical column of icons and appear on the display screen 102. As an alternative, the user may scroll down and select the icon for any of the remaining applications.

The rhyming riddle function shown in FIG. 3 may be varied and the interface described herein may still be used. For example, the set of answer choices may be removed from the exhibitory window 300 and the user may type his or her answers to the rhyming riddles. There may be other variations of the rhyming riddle function available to the user. For example, in a variant entitled "Connections," the database may be instructed to choose a topic from any of the categories 206-214 and form a group of rhyming riddles that concern a person, work, happening, place, and principle associated with the topic. The rhyming riddles may be sequentially presented to the user. In a variation entitled "Yesteryears," the exhibitory window 300 may display rhyming riddles that reference significant events that happened in the same year, period, or epoch. The user may solve these rhyming riddles by selecting the year, period, or epoch in which the events occurred.

Furthermore, the educational tool may include functions that do not require the user to solve rhyming riddles. These functions serve to review the content of rhyming riddles previously considered by the user. They are also implemented using the interface described herein. Specifically, any of these functions may be included in the subset of functions displayed on the summary menu 200 and may be selected by the user. A function entitled "True or False?" may display a statement in the exhibitory window 300. The statement may be followed by "True" and "False" answer choices. The user may select one of the answer choices based upon his or her recall of rhyming riddles considered while using the rhyming riddle function of the educational tool application.

The function "Who Said This?" may concern aphorisms, quotes, or wise words attributable to famous people. When this function is chosen, the exhibitory window 300 may display a statement in quotation marks followed by a question asking for attribution. The answer choices are famous people and the user may select the person that he or she believes made the statement. This function of the educational tool application requires the user to recall rhyming riddles about the person who made the statement. The rhyming riddles may have included the statement in its entirety or at least a reference to the statement.

When the function "Vocabulary Builder" is chosen, the user has to recall words that appear in rhyming riddles he or she has already solved. When presented with the rhyming riddles, the user was probably unfamiliar with the words and had to rely on context to determine their meanings. These words are the focus of the function "Vocabulary Builder." This function may display a definition and a set of words in the exhibitory window 300. The user selects the word that he or she thinks has the displayed definition. The objective is to add the word to the user's vocabulary.

Any of the functions of the educational tool may be implemented using the interface described above. The interface allows the user to navigate quickly and efficiently to activate the desired function. Improved navigation characterizes the interface from the main menu 104 to the arrows 232, 324, and 326 that appear at the bottom of the summary menu 200 and exhibitory window 300. On the main menu 104, icons for various applications are aligned vertically with one icon and its name to a line. This arrangement is an improvement over more conventional arrangements of application icons. The interface allows the user to place the icons for his or her favored applications at the top of the vertical list of icons. Hence, the icons for the user's favored applications are easily accessed. The remaining icons appear in the vertical list below the icons for the favored applications. The user simply scrolls down the list to find the icon for an application he or she intends to access. The vertical list of icons on the main menu 104 is preferable to conventional arrangements that require the user to page through a number of screens that contain a myriad of icons often haphazardly grouped together.

The summary menu 200 is accessed directly from the main menu 104 when the user selects the icon for the educational tool application. A limited list of the functions provided by the application is displayed on the summary menu 200 while the application is in an unlaunched state. Accordingly, the summary menu 200 requires that limited information be presented to the user in a specific manner. In contrast, conventional interface methods display a generic index. The manner in which limited information is presented to a user is an improvement over conventional interface methods. The result is an improved user interface for an electronic device.

The limited list of functions displayed by the summary menu 200 and the application's unlaunched state result in streamlined navigation. The user can quickly move to the desired function because he or she no longer has to navigate to the required application, open it, and then navigate within that application to locate the function of interest. Paging through multiple screens of options is no longer necessary. As discussed above, the exhibitory window 300 and the desired function are reached after only three steps from start up.

Furthermore, the interface has positive implications for the electronic device's memory. The educational tool application is not running when in the unlaunched state. The application remains in this state until the user selects a first icon from the first series of icons and a second icon from the second series of icons displayed on the summary menu 200. The selection of the two icons launches the application and initiates the function of interest. In contrast, conventional navigation techniques launch an application as soon as the user navigates to it. In addition, the application is running the entire time the user is navigating within the application as he or she searches for the function of interest. As a consequence, conventional navigation techniques are more of a memory drain than the interface. Hence, the benefits of the interface include a more efficient use of the electronic device's memory.

The design of the summary menu 200 contributes to the overall effectiveness of the interface. For example, the category that an icon represents is easily identified. The icons are labeled and contain pictorial representations of the various categories. It is unlikely that a user would choose the wrong icon (i.e., an icon other than the icon he or she intended to select). Likewise, the level of difficulty that corresponds to an icon is readily determined. The large numbers that differentiate the icons should make it easy for the user to choose the correct icon (i.e., the icon he or she intended to select).

Furthermore, the summary menu 200 may have safeguards that ensure a function is properly initiated and executed. The rhyming riddle function will fail to execute if only one icon is chosen. For example, the database cannot select a rhyming riddle unless both the category and level of difficulty are specified. When only one icon is chosen, the function might initiate, but it would not execute. The user would be presented with a blank exhibitory window 300. As a precaution, the summary window 200 may not allow the function to initiate if only one icon is selected.

Arrows 232, 324, and 326 can be chosen for speedy and efficient navigation between screens. The destination screens are reached as quickly as possible. The selection of arrow 232 takes the user from the summary menu 200 directly to the main menu 104; there are no intervening screens. Likewise, when arrow 324 is chosen, the user is taken from the exhibitory screen 300 to a screen that provides information about the correct answer to the rhyming riddle. The transition between screens is nearly instantaneous. There are no interposed screens that slow navigation from one screen to the other. The results are similar when arrow 326 is selected. The transition between the exhibitory window 300 and the summary menu 200 is quick and direct. As before, there are no intermediate screens to slow the transition. The use of arrows 232, 324, and 326 to navigate between screens contributes to the overall speed and efficiency of the interface.

The interface is particularly effective when used with electronic devices having small screens. Hence, it has been described in this disclosure and depicted in the figures as part of a mobile phone 100. The interface is especially well-suited for small screens because it overcomes the constraints that result from their small size. Small screens typically need a function to be divided into many layers or views. Conventional interfaces require a user to navigate through many layers to reach a desired function. A user has to scroll and switch views many times to locate the function of interest. The result is a slow and complicated process. In contrast, the present interface displays a summary menu 200 for a given application which allows the user to directly select the function of interest. The user is rapidly and readily taken to the exhibitory window 300 where the desired function is prominently displayed.

Although it is particularly well-suited for mobile phones, the present interface may be used with other electronic devices. Desktop computers, laptop computers, tablets, notebooks, or any other electronic devices having sufficient processing capabilities will benefit from implementation of the present interface.

Figure 4:
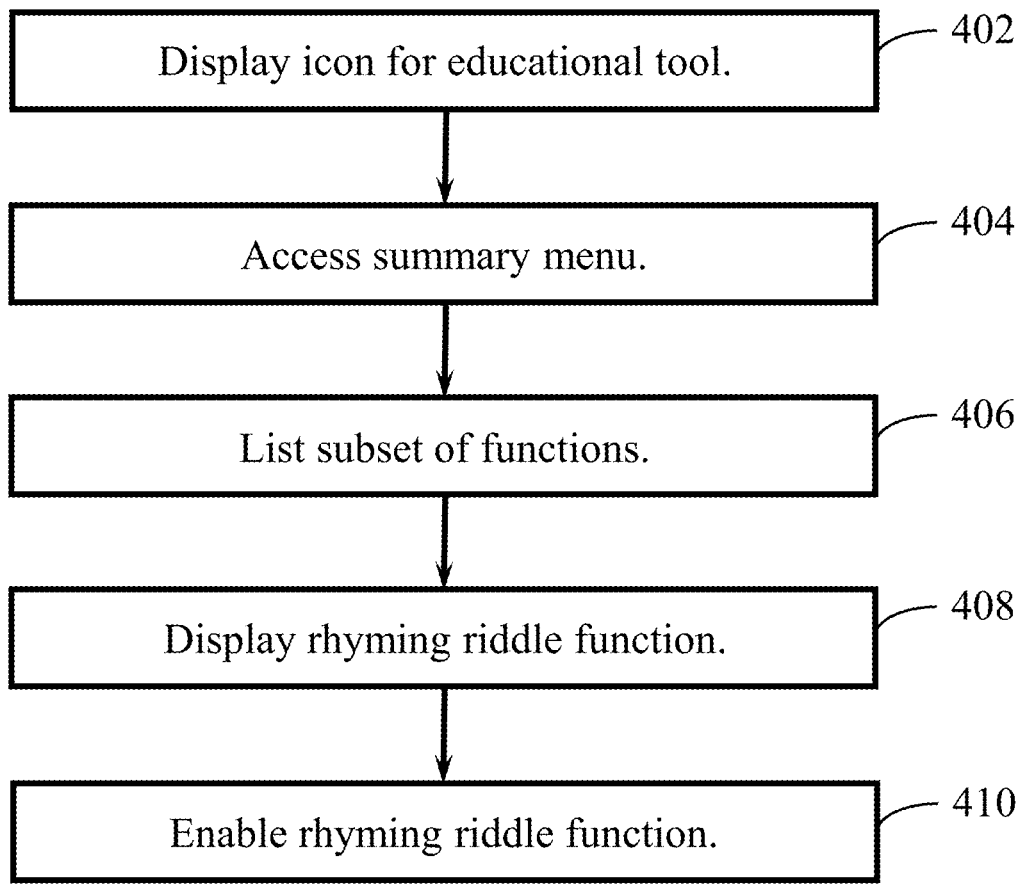
FIG. 4 is a process flow diagram of a method for implementing an interface for an educational tool on an electronic device.

FIG. 4 is a process flow diagram of a method for implementing an interface for an educational tool on an electronic device. The method 400 may be performed by the mobile phone 100 executing the interface shown in FIGS. 1-3.

At block 402, the icon for the educational tool 108 may be displayed on the main menu 104 that appears on the display screen 102 of an electronic device. At block 404, the summary menu 200 may be accessed directly from the main menu 104 when a user selects the icon for the educational tool 108. At block 406, a subset of at least one function of the educational tool may be listed on the summary menu 200. The electronic device may identify the at least one function of the educational tool that is most often selected by the user and create the subset from the at least one function.

At block 408, the exhibitory window 300 may display the rhyming riddle function of the educational tool 108 selected by the user from the subset of at least one function listed on the summary menu 200. At block 410, the rhyming riddle function may be enabled to present the user with a rhyming riddle 304 to be solved. A set of answer choices 308-314 including the correct answer to the rhyming riddle 304 is also presented to the user. The user may be allowed to select an answer choice from the set of answer choices 308-314.

Figure 5:
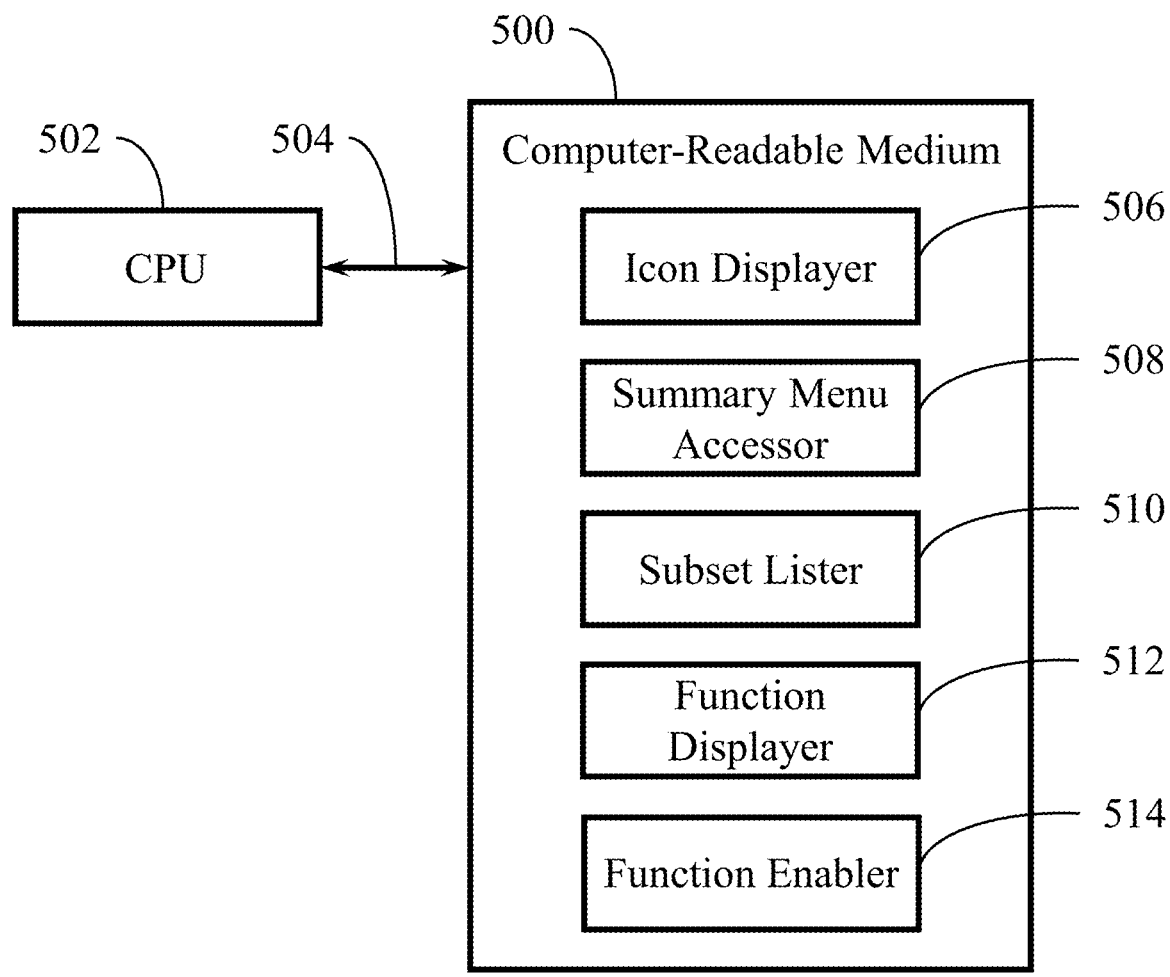
FIG. 5 is a block diagram showing a medium that contains logic for implementing the interface for the educational tool.

FIG. 5 is a block diagram showing a medium that contains logic for implementing the interface for the educational tool. The medium 500 may be a non-transitory computer-readable medium that stores code that can be accessed by a computer processing unit (CPU) 502 via a bus 504. For example, the computer-readable medium 500 can be a volatile or non-volatile storage device. The computer-readable medium 500 can also be a logic unit such as an application specific integrated circuit (ASIC), a field programmable gate array (FPGA), or an arrangement of logic gates implemented in one or more integrated circuits.

The medium 500 may include modules 506-514 configured to perform the techniques described herein. For example, an icon displayer 506 may be configured to display an icon for the educational tool 108 on a main menu 104 that appears on a display screen 102 of a mobile phone 100. A summary menu accessor 508 may be configured to access a summary menu 200 directly from the main menu 104 when a user selects the icon for the educational tool 108. A subset lister 510 is configured to list a subset of at least one function of the educational tool application on the summary window 200. A function displayer 512 may be configured to display a rhyming riddle function of the educational tool application selected by the user from the subset listed on the summary menu 200. The rhyming riddle function may be displayed in an exhibitory window 300. A function enabler 514 may be configured to enable the rhyming riddle function to present the user with a rhyming riddle 304 to be solved. In some embodiments, the modules 506-514 may be modules of computer code configured to direct the operations of the processor 502.

The block diagram of FIG. 5 is not intended to indicate that the medium 500 is to include all of the modules shown. Furthermore, the medium 500 may include any number of additional modules not shown in FIG. 5 depending on the details of the specific implementation.

The embodiments disclosed herein may be implemented as instructions stored on a tangible, non-transitory, machine-readable medium. These instructions may be read and executed by a computing platform to perform the functions described above. A tangible, non-transitory, machine-readable medium may include any tangible, non-transitory medium for storing information in a form readable by a machine, e.g., a computer. Examples of a tangible, non-transitory, machine-readable medium may include read only memory (ROM), random access memory (RAM), magnetic disk storage media, optical storage media, flash memory devices, or the like.

An embodiment is an implementation or example. Reference to "some embodiments" indicates that a particular feature, structure, or characteristic is included in at least some embodiments, but not necessarily in all embodiments, of the present techniques. The various occurrences of "some embodiments" are not necessarily referring to the same embodiments.

Not all features, structures, characteristics, etc. described and illustrated herein need to be included in a particular embodiment or embodiments. For example, if the specification states a feature, structure, or characteristic "may" be included, that particular feature, structure, or characteristic is not required to be included. If the specification or claims refer to "a" or "an" element, that does not mean there is only one of the element.

Some embodiments have been described by referring to particular implementations. However, other implementations are possible. The implementations of the present techniques are not limited to those disclosed herein. Additionally, the features described herein or illustrated in the figures need not be arranged or sequenced in the particular way described or illustrated. Other arrangements or sequences are possible.

In the systems shown in the figures, some elements may have the same reference number to suggest that the elements are similar. Alternatively, elements shown in the figures may have different reference numbers to suggest that the elements are different. However, an element may be flexible enough to have different implementations and work with some or all of the systems described herein or shown in the figures. Various elements described herein or depicted in the figures may be designated a first element, a second element, etc. It is arbitrary which element is referred to as the first element, the second element, and so on.

Details of the aforementioned examples may be used in one or more embodiments. For example, all optional features of the process flow diagram shown in FIG. 4 and described above may also be implemented in the embodiment shown in FIGS. 1-3 and described herein. Furthermore, flow diagrams have been used herein to describe embodiments. However, the present techniques are not limited to those diagrams or to the corresponding descriptions. For example, flow need not progress through each box or in exactly the same order as illustrated and described herein.

The present techniques are not restricted to the particular details described herein. Those skilled in the art having the benefit of this disclosure will appreciate that many other variations of the foregoing descriptions and accompanying figures are possible and remain within the scope of the present techniques. Accordingly, the scope of the present techniques is defined by the following claims and any amendments thereto.

What is claimed is:

1. An interface for an educational tool on an electronic device, comprising:
a main menu to display at least an icon for the educational tool, wherein the main menu appears on a display screen of the electronic device;
a summary menu to list a subset of at least one function of the educational tool, wherein the summary menu is accessed directly from the main menu when a user selects the icon for the educational tool;
an exhibitory window to display a rhyming riddle function of the educational tool selected by the user from the subset listed on the summary menu, wherein the rhyming riddle function presents the user with a rhyming riddle to be solved;
wherein the summary menu comprises a first series of icons representing categories for the rhyming riddle and the categories comprise people, works, happenings, places, and principles; wherein the summary menu comprises a second series of icons corresponding to levels of difficulty for the rhyming riddle and the levels of difficulty are integers that range from a minimum value for rhyming riddles that are easiest to solve to a maximum value for the rhyming riddles that are hardest to solve;
a first activator to open the summary menu without launching the educational tool when the user selects the icon for the educational tool;
a second activator to launch the educational tool and initiate the rhyming riddle function when the user selects a first icon from the first series of icons and a second icon from the second series of icons displayed on the summary menu;
an exchanger to replace the summary menu with the exhibitory window that displays the rhyming riddle function when the educational tool is launched and the rhyming riddle function is initiated;
a commander to instruct a database that stores the rhyming riddles to select the rhyming riddle that pertains to a category represented by the first icon and has a level of difficulty corresponding to the second icon;
a formulator to generate a set of answer choices that includes a correct answer to the rhyming riddle; and
a presenter to display the rhyming riddle and the set of answer choices in the exhibitory window.

2. The interface of claim 1, wherein the electronic device identifies the at least one function of the educational tool that is most often selected by the user and creates the subset from the at least one function.

3. The interface of claim 1, wherein the subset listed on the summary menu is formed based on a user selection of the at least one function.

4. The interface of claim 1, comprising a border that surrounds the summary menu and prevents the user from accessing other functions of the educational tool that are not part of the subset.

5. The interface of claim 1, comprising:
an enabler to allow the user to select an answer choice from the set of answer choices;
a determiner to ascertain if the answer choice selected by the user is the correct answer to the rhyming riddle; and
a suggester to offer the user an option to learn more about the correct answer.

6. A method for implementing an interface for an educational tool on an electronic device, comprising:
displaying at least an icon for the educational tool on a main menu that appears on a display screen of the electronic device;
accessing a summary menu directly from the main menu when a user selects the icon for the educational tool;
listing a subset of at least one function of the educational tool on the summary menu;
displaying in an exhibitory window a rhyming riddle function of the educational tool selected by the user from the subset listed on the summary menu;
enabling the rhyming riddle function to present the user with a rhyming riddle to be solved;
wherein the summary menu comprises a first series of icons representing categories for the rhyming riddle and the categories comprise people, works, happenings, places, and principles; wherein the summary menu comprises a second series of icons corresponding to levels of difficulty for the rhyming riddle and the levels of difficulty are integers that range from a minimum value for rhyming riddles that are easiest to solve to a maximum value for the rhyming riddles that are hardest to solve;
opening the summary menu without launching the educational tool when the user selects the icon for the educational tool;
launching the educational tool and initiating the rhyming riddle function when the user selects a first icon from the first series of icons and a second icon from the second series of icons displayed on the summary menu;
replacing the summary menu with the exhibitory window that displays the rhyming riddle function when the educational tool is launched and the rhyming riddle function is initiated;
instructing a database that stores rhyming riddles to select the rhyming riddle that pertains to a category represented by the first icon and has a level of difficulty corresponding to the second icon;

generating a set of answer choices that includes a correct answer to the rhyming riddle; and displaying the rhyming riddle and the set of answer choices in the exhibitory window.

7. The method of claim 6, comprising:

allowing the user to select an answer choice from the set of answer choices;

ascertaining if the answer choice selected by the user is the correct answer to the rhyming riddle; and offering the user an option to learn more about the correct answer.

8. At least one non-transitory computer-readable medium, comprising instructions to direct at least one processor to:

display at least an icon for an educational tool on a main menu that appears on a display screen of an electronic device;

access a summary menu directly from the main menu when a user selects the icon for the educational tool;

list a subset of at least one function of the educational tool on the summary menu;

display in an exhibitory window a rhyming riddle function of the educational tool selected by the user from the subset listed on the summary menu;

enable the rhyming riddle function to present the user with a rhyming riddle to be solved;

wherein the summary menu comprises a first series of icons representing categories for the rhyming riddle and the categories comprise people, works, happenings, places, and principles; wherein the summary menu comprises a second series of icons corresponding to levels of difficulty for the rhyming riddle and the levels of difficulty are integers that range from a minimum value for rhyming riddles that are easiest to solve to a maximum value for the rhyming riddles that are hardest to solve;

open the summary menu without launching the educational tool when the user selects the icon for the educational tool;

launch the educational tool and initiate the rhyming riddle function when the user selects a first icon from the first series of icons and a second icon from the second series of icons displayed on the summary menu;

replace the summary menu with the exhibitory window that displays the rhyming riddle function when the educational tool is launched and the rhyming riddle function is initiated;

instruct a database that stores rhyming riddles to select the rhyming riddle that pertains to a category represented by the first icon and has a level of difficulty corresponding to the second icon;

generate a set of answer choices that includes a correct answer to the rhyming riddle; and display the rhyming riddle and the set of answer choices in the exhibitory window.

9. The at least one non-transitory computer-readable medium of claim 8, comprising instructions to:

allow the user to select an answer choice from the set of answer choices; and ascertain if the answer choice selected by the user is the correct answer to the rhyming riddle; and offer the user an option to learn more about the correct answer.

\* \* \* \* \*